United States Patent
Hirata et al.

(10) Patent No.: US 8,733,894 B2
(45) Date of Patent: May 27, 2014

(54) RECORDING APPARATUS AND COLOR SAMPLE TABLE

(75) Inventors: Shiki Hirata, Shiojiri (JP); Tsuyoshi Sano, Shiojiri (JP); Shoki Kasahara, Shiojiri (JP)

(73) Assignee: Seiko Epson Corporation (JP)

( * ) Notice: Subject to any disclaimer, the term of this patent is extended or adjusted under 35 U.S.C. 154(b) by 219 days.

(21) Appl. No.: 13/353,837

(22) Filed: Jan. 19, 2012

(65) Prior Publication Data

US 2012/0212754 A1     Aug. 23, 2012

(30) Foreign Application Priority Data

Feb. 18, 2011 (JP) .................................. 2011-033523

(51) Int. Cl.
*B41J 2/01* (2006.01)
*H04N 1/60* (2006.01)

(52) U.S. Cl.
USPC ................. 347/43; 347/9; 347/20; 347/101; 347/104; 358/1.9; 358/2.1

(58) Field of Classification Search
CPC ..................................... B41J 2/01; H04N 1/60
USPC ............. 347/43, 9, 20, 100–104; 358/1.9, 2.1
See application file for complete search history.

(56) References Cited

U.S. PATENT DOCUMENTS

| | | | |
|---|---|---|---|
| 6,612,675 B1* | 9/2003 | Takahashi | 347/16 |
| 7,283,239 B2* | 10/2007 | Nonogaki et al. | 356/402 |
| 7,815,303 B2* | 10/2010 | Kasai | 347/102 |
| 7,828,888 B2 | 11/2010 | Itano et al. | |
| 7,891,799 B2* | 2/2011 | Edwards et al. | 347/100 |
| 2005/0200646 A1* | 9/2005 | Deer et al. | 347/20 |
| 2006/0189712 A1* | 8/2006 | Kondo | 523/160 |
| 2009/0220695 A1* | 9/2009 | Oyanagi et al. | 427/256 |
| 2009/0244137 A1* | 10/2009 | Kakutani | 347/12 |
| 2012/0040155 A1* | 2/2012 | Komatsu et al. | 428/204 |

FOREIGN PATENT DOCUMENTS

JP       2009-256565       11/2009

* cited by examiner

*Primary Examiner* — Manish S Shah
*Assistant Examiner* — Jeremy Delozier
(74) *Attorney, Agent, or Firm* — Harness, Dickey & Pierce, P.L.C.

(57) ABSTRACT

A recording apparatus records a glitter color image on a medium by superimposing a glitter image formed by discharging a glitter ink and a color image formed by discharging at least one of a first color ink and a second color ink. The recording apparatus records a color sample table including a first pattern obtained by superimposing a glitter image formed with a predetermined ink amount per unit area and a color image; and a second pattern obtained by superimposing a glitter image formed with the predetermined ink amount per unit area and a color image having substantially the same color as that of the color image of the first pattern by using the first color ink or the second color ink at a different ink amount per unit area from that of the color image of the first pattern.

9 Claims, 13 Drawing Sheets

| | L* | a* | b* | H [deg] | C* | GLOSSINESS |
|---|---|---|---|---|---|---|
| duty60% | 11.7 | -2.25 | -2.47 | 47.67 | 11.91 | 535 |
| duty50% | 14.9 | -2.05 | -2.21 | 47.15 | 15.04 | 502 |
| duty40% | 27.33 | -2.16 | 0.2 | -5.29 | 27.42 | 399 |

FIG. 1

|  | L* | a* | b* | H [deg] | C* | GLOSSINESS |
|---|---|---|---|---|---|---|
| duty60% | 11.7 | -2.25 | -2.47 | 47.67 | 11.91 | 535 |
| duty50% | 14.9 | -2.05 | -2.21 | 47.15 | 15.04 | 502 |
| duty40% | 27.33 | -2.16 | 0.2 | -5.29 | 27.42 | 399 |

FIG. 2 duty60% + 37C

| duty | L* | a* | b* | H [deg] | C* | GLOSSINESS | E* |
|---|---|---|---|---|---|---|---|
| 10% | 23.47 | -4.66 | -2.44 | 207.637 | 5.26 | 335 | 24.05 |
| 11% | 23.39 | -4.86 | -2.57 | 207.870 | 5.50 | 322 | 24.03 |
| 12% | 23.24 | -5.13 | -2.77 | 208.367 | 5.83 | 316 | 23.96 |
| 13% | 23.16 | -5.40 | -3.04 | 209.378 | 6.20 | 307 | 23.97 |
| 14% | 23.08 | -5.68 | -3.24 | 209.701 | 6.54 | 301 | 23.99 |
| 15% | 22.98 | -5.97 | -3.62 | 211.231 | 6.98 | 297 | 24.02 |
| 16% | 22.89 | -6.24 | -3.92 | 212.137 | 7.37 | 289 | 24.05 |
| 17% | 22.76 | -6.57 | -4.21 | 212.651 | 7.80 | 282 | 24.06 |
| 18% | 22.65 | -6.92 | -4.56 | 213.383 | 8.29 | 274 | 24.12 |
| 19% | 22.50 | -7.29 | -4.97 | 214.284 | 8.82 | 267 | 24.17 |
| 20% | 22.39 | -7.66 | -5.28 | 214.578 | 9.30 | 262 | 24.25 |
| 21% | 22.22 | -7.97 | -5.69 | 215.524 | 9.79 | 256 | 24.28 |
| 22% | 21.94 | -8.38 | -5.97 | 215.466 | 10.29 | 247 | 24.23 |
| 23% | 21.62 | -8.76 | -6.41 | 216.194 | 10.85 | 244 | 24.19 |
| 24% | 21.24 | -9.28 | -6.92 | 216.712 | 11.58 | 240 | 24.19 |
| 25% | 20.94 | -9.68 | -7.33 | 217.134 | 12.14 | 234 | 24.21 |
| 26% | 20.55 | -10.19 | -7.78 | 217.362 | 12.82 | 230 | 24.22 |
| 27% | 20.26 | -10.55 | -8.21 | 217.890 | 13.37 | 222 | 24.27 |
| 28% | 19.93 | -10.91 | -8.76 | 218.762 | 13.99 | 217 | 24.35 |
| 29% | 19.69 | -11.20 | -9.27 | 219.614 | 14.54 | 209 | 24.48 |
| 30% | 19.53 | -11.53 | -9.74 | 220.190 | 15.09 | 196 | 24.68 |
| 40% | 17.09 | -13.01 | -15.29 | 229.606 | 20.08 | 170 | 26.36 |
| 50% | 14.93 | -13.96 | -18.96 | 233.636 | 23.54 | 157 | 27.88 |
| 60% | 13.44 | -14.28 | -20.99 | 235.772 | 25.39 | 144 | 28.73 |
| 70% | 11.96 | -12.67 | -22.28 | 240.374 | 25.63 | 135 | 28.28 |
| 80% | 10.65 | -11.34 | -22.93 | 243.685 | 25.58 | 131 | 27.71 |

FIG. 3 duty60% + 37Lc

| duty | L* | a* | b* | H [deg] | C* | GLOSSINESS | E* |
|---|---|---|---|---|---|---|---|
| 10% | 24.31 | -2.39 | -0.72 | 196.765 | 2.50 | 387 | 24.44 |
| 20% | 24.59 | -3.99 | -2.07 | 207.420 | 4.49 | 364 | 25.00 |
| 21% | 24.42 | -4.10 | -2.29 | 209.185 | 4.70 | 360 | 24.87 |
| 22% | 24.21 | -4.32 | -2.51 | 210.157 | 5.00 | 359 | 24.72 |
| 23% | 23.92 | -4.56 | -2.72 | 210.816 | 5.31 | 359 | 24.50 |
| 24% | 23.71 | -4.75 | -2.95 | 211.842 | 5.59 | 352 | 24.36 |
| 25% | 23.49 | -4.95 | -3.18 | 212.718 | 5.88 | 351 | 24.22 |
| 26% | 23.26 | -5.14 | -3.30 | 212.701 | 6.11 | 349 | 24.05 |
| 27% | 23.04 | -5.33 | -3.56 | 213.740 | 6.41 | 347 | 23.91 |
| 28% | 22.82 | -5.52 | -3.92 | 215.380 | 6.77 | 347 | 23.80 |
| 29% | 22.60 | -5.71 | -4.21 | 216.401 | 7.09 | 343 | 23.69 |
| 30% | 22.38 | -5.90 | -4.52 | 217.456 | 7.43 | 340 | 23.58 |
| 40% | 21.40 | -8.04 | -7.27 | 222.121 | 10.84 | 294 | 23.99 |
| 50% | 20.63 | -10.69 | -9.35 | 221.175 | 14.20 | 231 | 25.05 |
| 60% | 19.70 | -13.22 | -10.14 | 217.489 | 16.66 | 173 | 25.80 |
| 70% | 17.99 | -14.62 | -11.22 | 217.504 | 18.43 | 143 | 25.75 |
| 80% | 16.06 | -13.63 | -14.56 | 226.890 | 19.94 | 151 | 25.61 |

FIG. 4 duty60% + 33C

| duty | L* | a* | b* | H [deg] | C* | GLOSSINESS | E* |
|---|---|---|---|---|---|---|---|
| 10% | 25.57 | -3.00 | -2.03 | 214.085 | 3.62 | 383 | 25.83 |
| 11% | 25.35 | -3.14 | -2.15 | 214.400 | 3.81 | 381 | 25.63 |
| 12% | 25.18 | -3.23 | -2.36 | 216.154 | 4.00 | 376 | 25.50 |
| 13% | 24.92 | -3.33 | -2.56 | 217.552 | 4.20 | 372 | 25.27 |
| 14% | 24.53 | -3.47 | -2.75 | 218.397 | 4.43 | 369 | 24.93 |
| 15% | 24.37 | -3.63 | -3.05 | 220.038 | 4.74 | 366 | 24.83 |
| 16% | 24.16 | -3.83 | -3.31 | 220.835 | 5.06 | 362 | 24.68 |
| 17% | 23.93 | -4.09 | -3.65 | 221.746 | 5.48 | 358 | 24.55 |
| 18% | 23.64 | -4.31 | -3.94 | 222.432 | 5.84 | 354 | 24.35 |
| 19% | 23.33 | -4.51 | -4.22 | 223.097 | 6.18 | 353 | 24.13 |
| 20% | 23.06 | -4.68 | -4.60 | 224.506 | 6.56 | 348 | 23.98 |
| 21% | 22.94 | -4.93 | -4.93 | 225.000 | 6.97 | 344 | 23.98 |
| 22% | 22.79 | -5.24 | -5.26 | 225.109 | 7.42 | 341 | 23.97 |
| 23% | 22.60 | -5.48 | -5.59 | 225.569 | 7.83 | 336 | 23.92 |
| 24% | 22.42 | -5.73 | -5.90 | 225.837 | 8.22 | 331 | 23.88 |
| 25% | 22.23 | -5.94 | -6.15 | 225.995 | 8.55 | 327 | 23.82 |
| 26% | 22.08 | -6.19 | -6.50 | 226.399 | 8.98 | 322 | 23.83 |
| 27% | 21.98 | -6.46 | -6.90 | 226.886 | 9.45 | 317 | 23.93 |
| 28% | 21.89 | -6.78 | -7.34 | 227.271 | 9.99 | 313 | 24.06 |
| 29% | 21.77 | -7.07 | -7.66 | 227.294 | 10.42 | 310 | 24.14 |
| 30% | 21.70 | -7.30 | -8.01 | 227.655 | 10.84 | 306 | 24.26 |
| 40% | 20.78 | -10.27 | -10.42 | 225.415 | 14.63 | 247 | 25.41 |
| 50% | 19.68 | -13.33 | -11.42 | 220.587 | 17.55 | 182 | 26.37 |
| 60% | 17.27 | -14.42 | -12.45 | 220.807 | 19.05 | 147 | 25.71 |
| 70% | 15.29 | -12.68 | -17.40 | 233.918 | 21.53 | 155 | 26.41 |
| 80% | 14.26 | -11.75 | -21.59 | 241.443 | 24.58 | 174 | 28.42 |

FIG. 5

| | duty | L* | a* | b* | H [deg] | C* | E* | GLOSSINESS |
|---|---|---|---|---|---|---|---|---|
| SPECIFIC EXAMPLE 1 | duty60% + 37Lc | 28% | 22.82 | -5.52 | -3.92 | 215.38 | 6.77 | 23.80 | 347 |
| | duty60% + 37C | 19% | 22.50 | -7.29 | -4.97 | 214.28 | 8.82 | 24.17 | 267 |
| SPECIFIC EXAMPLE 2 | duty60% + 37Lc | 20% | 24.59 | -3.99 | -2.07 | 207.42 | 4.49 | 25.00 | 364 |
| | duty60% + 37C | 10% | 23.47 | -4.66 | -2.44 | 207.64 | 5.26 | 24.05 | 335 |
| SPECIFIC EXAMPLE 3 | duty60% + 37Lc | 50% | 20.63 | -10.69 | -9.35 | 221.17 | 14.20 | 25.05 | 231 |
| | duty60% + 37C | 30% | 19.53 | -11.53 | -9.74 | 220.19 | 15.09 | 24.68 | 196 |
| SPECIFIC EXAMPLE 4 | duty60% + 37Lc | 20% | 24.59 | -3.99 | -2.07 | 207.42 | 4.49 | 25.00 | 364 |
| | duty60% + 37C | 14% | 23.08 | -5.68 | -3.24 | 209.70 | 6.54 | 23.99 | 301 |
| SPECIFIC EXAMPLE 5 | duty60% + 37Lc | 60% | 19.70 | -13.22 | -10.14 | 217.49 | 16.66 | 25.80 | 173 |
| | duty60% + 37C | 27% | 20.26 | -10.55 | -8.21 | 217.89 | 13.37 | 24.27 | 222 |

FIG. 6

| | duty | L* | a* | b* | H [deg] | C* | E* | GLOSSINESS |
|---|---|---|---|---|---|---|---|---|
| SPECIFIC EXAMPLE 6 | duty60% + 37C | 50% | 14.93 | -12.67 | -22.28 | 240.37 | 25.63 | 29.66 | 135 |
| | duty60% + 33C | 70% | 15.29 | -11.75 | -21.59 | 241.44 | 24.58 | 28.95 | 174 |
| SPECIFIC EXAMPLE 7 | duty60% + 37Lc | 28% | 22.82 | -5.52 | -3.92 | 215.38 | 6.77 | 23.80 | 347 |
| | duty60% + 33C | 12% | 25.18 | -3.23 | -2.36 | 216.15 | 4.00 | 25.50 | 376 |
| SPECIFIC EXAMPLE 8 | duty60% + 37Lc | 30% | 22.38 | -5.90 | -4.52 | 217.46 | 7.43 | 23.58 | 340 |
| | duty60% + 33C | 13% | 24.92 | -3.33 | -2.56 | 217.55 | 4.20 | 25.27 | 372 |
| SPECIFIC EXAMPLE 9 | duty60% + 37C | 30% | 19.53 | -11.53 | -9.74 | 220.19 | 15.09 | 24.68 | 196 |
| | duty60% + 33C | 60% | 17.27 | -14.42 | -12.45 | 220.81 | 19.05 | 25.71 | 147 |
| SPECIFIC EXAMPLE 10 | duty60% + 37C | 18% | 22.65 | -6.92 | -4.56 | 213.38 | 8.29 | 24.12 | 274 |
| | duty60% + 33C | 11% | 25.35 | -3.14 | -2.15 | 214.40 | 3.81 | 25.63 | 381 |
| SPECIFIC EXAMPLE 11 | duty60% + 37Lc | 26% | 23.26 | -5.14 | -3.30 | 212.70 | 6.11 | 24.05 | 349 |
| | duty60% + 33C | 10% | 25.57 | -3.00 | -2.03 | 214.08 | 3.62 | 25.83 | 381 |

FIG. 7

| ICC37 | L* | a* | b* | HUE ANGLE [rad] | HUE ANGLE [deg] |
|---|---|---|---|---|---|
| 10 | 67.16 | -27.01 | -43.77 | 1.02 | 238.3 |
| 40 | 44.04 | -21.8 | -69.49 | 1.27 | 252.6 |
| 60 | 39.32 | -12.76 | -72.15 | 1.40 | 260.0 |
| 90 | 34.22 | -3.34 | -73.36 | 1.53 | 267.4 |
| ICLC37 | L* | a* | b* | HUE ANGLE [rad] | HUE ANGLE [deg] |
| 10 | 80.57 | -20.71 | -26.98 | 0.92 | 232.5 |
| 40 | 64.94 | -42.86 | -48.73 | 0.85 | 228.7 |
| 60 | 58.62 | -41.45 | -57.47 | 0.95 | 234.2 |
| 90 | 53.46 | -37.52 | -62.64 | 1.03 | 239.1 |
| ICC33 | L* | a* | b* | HUE ANGLE [rad] | HUE ANGLE [deg] |
| 10 | 72.84 | -30.69 | -35.78 | 0.86 | 229.4 |
| 40 | 55.95 | -41.74 | -57.96 | 0.95 | 234.2 |
| 60 | 50.93 | -36.03 | -62.98 | 1.05 | 240.2 |
| 90 | 46.2 | -27.76 | -66.5 | 1.18 | 247.3 |

FIG. 8

|  | ΔH + ΔC | ΔH + ΔC JUDGMENT | DIFFERENCE IN GLOSSINESS | JUDGMENT OF GLOSSINESS |
|---|---|---|---|---|
| SPECIFIC EXAMPLE 1 | 3.15 | B | 80 | HIGH |
| SPECIFIC EXAMPLE 2 | 0.98 | S | 29 | LOW |
| SPECIFIC EXAMPLE 3 | 1.88 | A | 35 | MEDIUM |
| SPECIFIC EXAMPLE 4 | 4.33 | C | 63 | HIGH |
| SPECIFIC EXAMPLE 5 | 3.69 | B | 49 | MEDIUM |
| SPECIFIC EXAMPLE 6 | 2.12 | A | 32 | MEDIUM |
| SPECIFIC EXAMPLE 7 | 3.54 | B | 29 | LOW |
| SPECIFIC EXAMPLE 8 | 3.33 | B | 32 | MEDIUM |
| SPECIFIC EXAMPLE 9 | 4.57 | C | 49 | MEDIUM |
| SPECIFIC EXAMPLE 10 | 5.50 | C | 107 | HIGH |
| SPECIFIC EXAMPLE 11 | 3.87 | B | 32 | MEDIUM |

FIG. 11
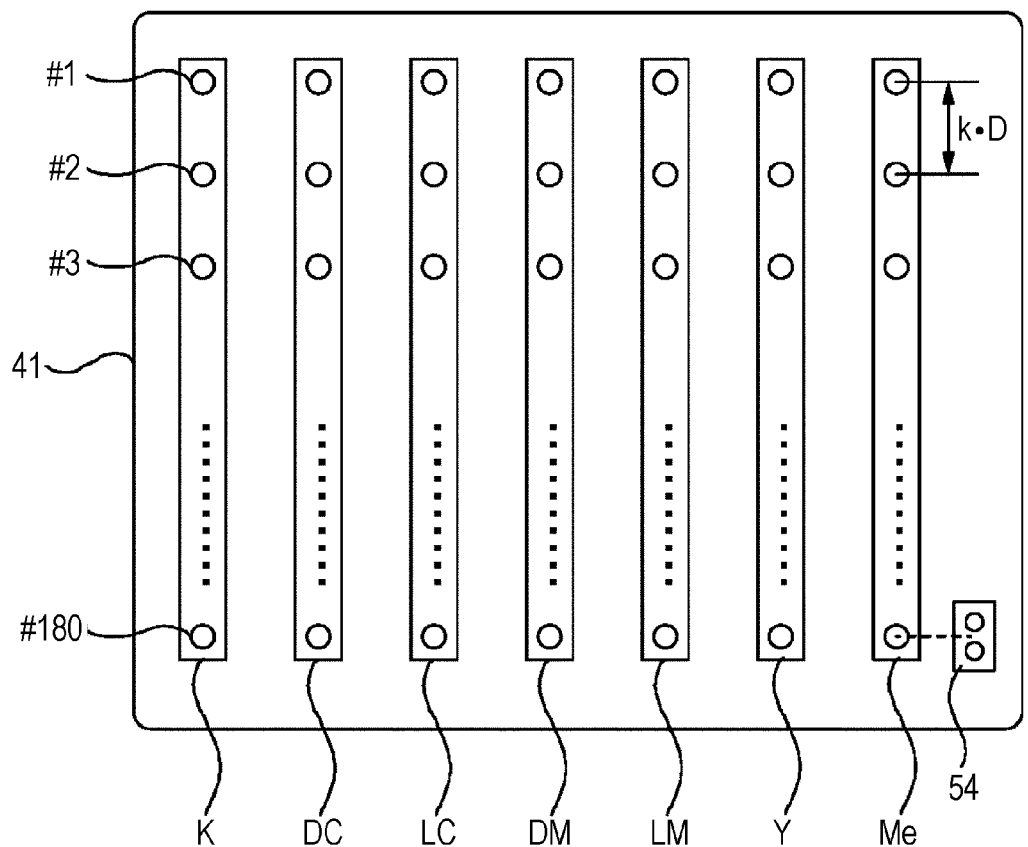
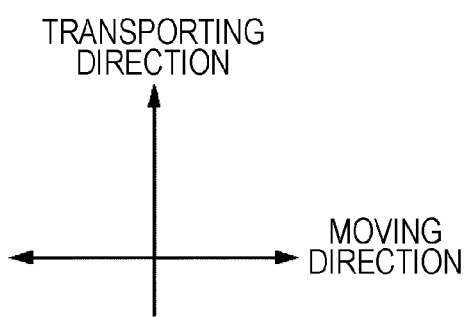

FIG. 12
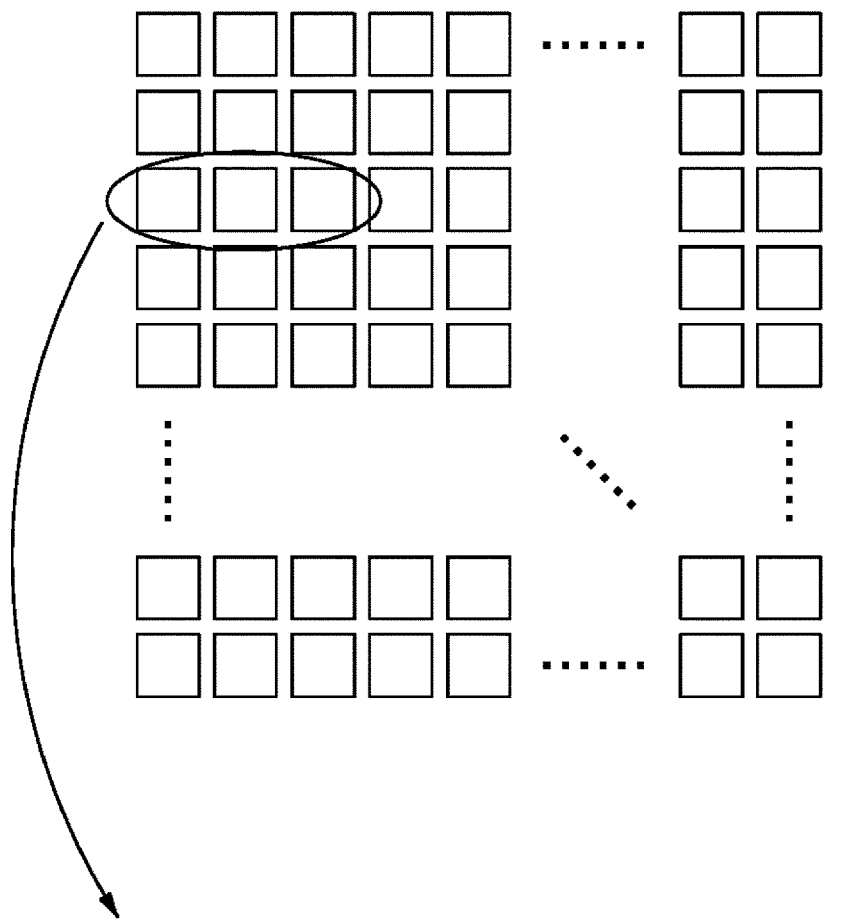
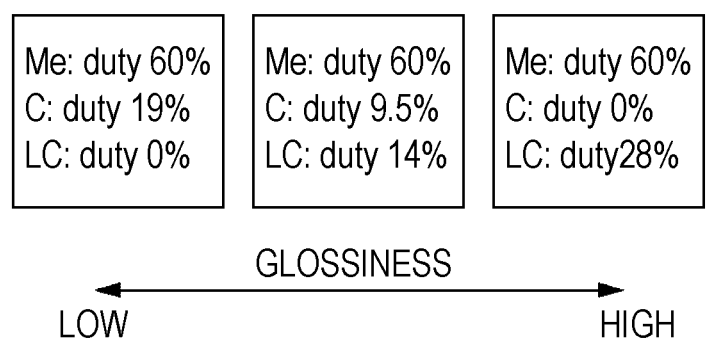
GLOSSINESS
LOW ←——————→ HIGH

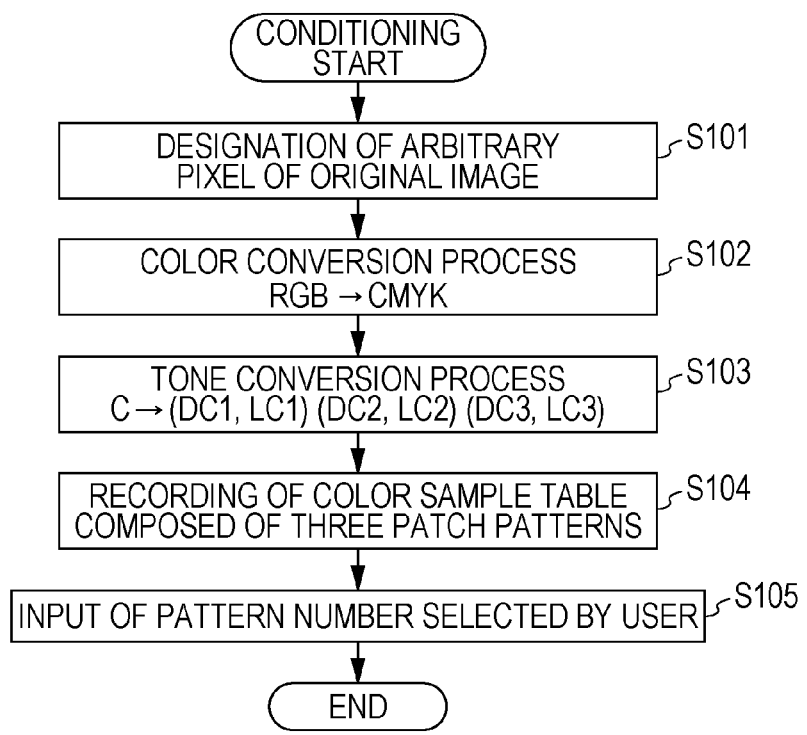
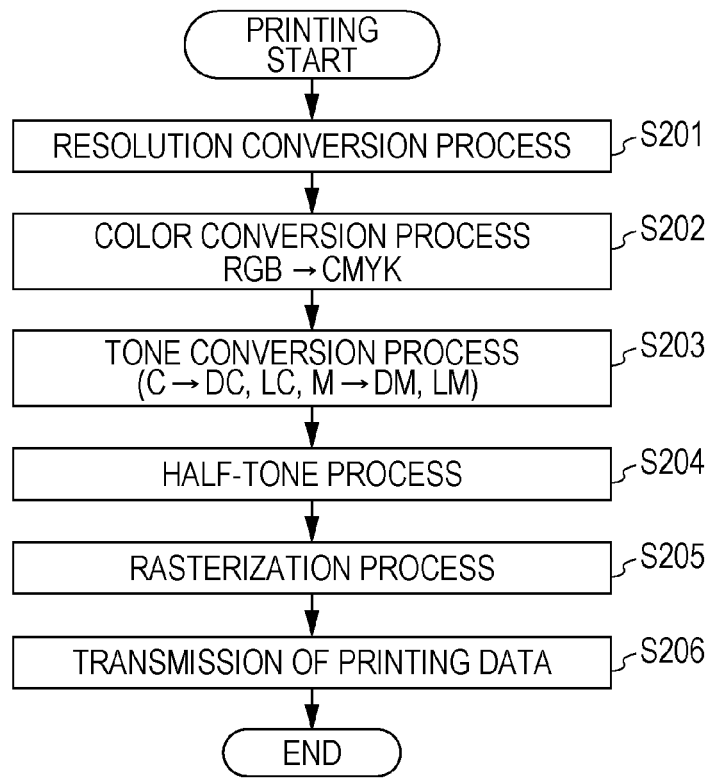

RECORDING APPARATUS AND COLOR SAMPLE TABLE

Priority is claimed under 35 U.S.C. §119 to Japanese Application No. 2011-033523 filed on Feb. 18, 2011, is hereby incorporated by reference in its entirety.

BACKGROUND

1. Technical Field

The present invention relates to a recording apparatus and a color sample table.

2. Related Art

It is known that recording apparatuses use glitter inks having brilliance for recording images having metallic gloss on media such as paper. JP-A-2009-256565 proposes a glitter ink that is used in ink jet recording apparatuses.

It is thought to record a glossy color image on a medium by superimposing an image formed with a glitter ink (hereinafter referred to as glitter image) and an image formed with a color ink (hereinafter referred to as color image). In such a case, a dark color portion is output by placing a large amount of a color ink into the portion, which may change or decrease the glossiness provided by a glitter ink. That is, a color image having both the color and the glossiness intended to be output may not be formed.

SUMMARY

An advantage of some aspects of the invention is to provide a recording apparatus and a color sample table for adjusting glossiness using a color ink.

The main invention for achieving the above-mentioned aspect is a recording apparatus that has a glitter ink nozzle capable of discharging a glitter ink to a medium, a first color ink nozzle capable of discharging a first color ink to the medium, and a second color ink nozzle capable of discharging a second color ink that is different from the first color ink to the medium and records a glitter color image on the medium through superimposing a glitter image formed by discharging the glitter ink and a color image formed by discharging at least one of the first color ink and the second color ink. The recording apparatus records a color sample table including a first pattern obtained by superimposing the glitter image and the color image and including a second pattern obtained by superimposing the glitter image and the color image having substantially the same color as that of the color image of the first pattern but different glossiness from that of the first pattern by using the first color ink or the second color ink at a different ink amount per unit area from that of the color image of the first pattern.

Other features of the invention are clarified by descriptions in the specification and the accompanying drawings.

BRIEF DESCRIPTION OF THE DRAWINGS

The invention will be described with reference to the accompanying drawings, wherein like numbers reference like elements.

FIG. 1 is a table showing measurement results of glitter patterns.

FIG. 2 is a table showing measurement results of glitter color patterns in the case using a dark cyan ink.

FIG. 3 is a table showing measurement results of glitter color patterns in the case using a light cyan ink containing the same coloring material as that of the dark cyan ink in FIG. 2.

FIG. 4 is a table showing measurement results of glitter color patterns in the case using a cyan ink containing a different coloring material from that of the cyan inks in FIGS. 2 and 3.

FIG. 5 shows five specific combinations (Specific Examples 1 to 5) extracted from the measurement results in FIGS. 2 and 3.

FIG. 6 shows six specific combinations (Specific Examples 6 to 11) extracted from the measurement results in FIG. 2 or 3 and 4.

FIG. 7 shows measurement results of difference in hue angle of cyan inks.

FIG. 8 is a table showing judgment results of Specific Examples 1 to 11.

FIG. 11 is an explanatory drawing of the underside of a carriage.

FIG. 12 is an explanatory drawing of a color sample table in a First Embodiment.

FIG. 15 is a flow chart of conditioning.

FIG. 16 is a flow chart of printing.

DESCRIPTION OF EXEMPLARY EMBODIMENTS

Figure 9:
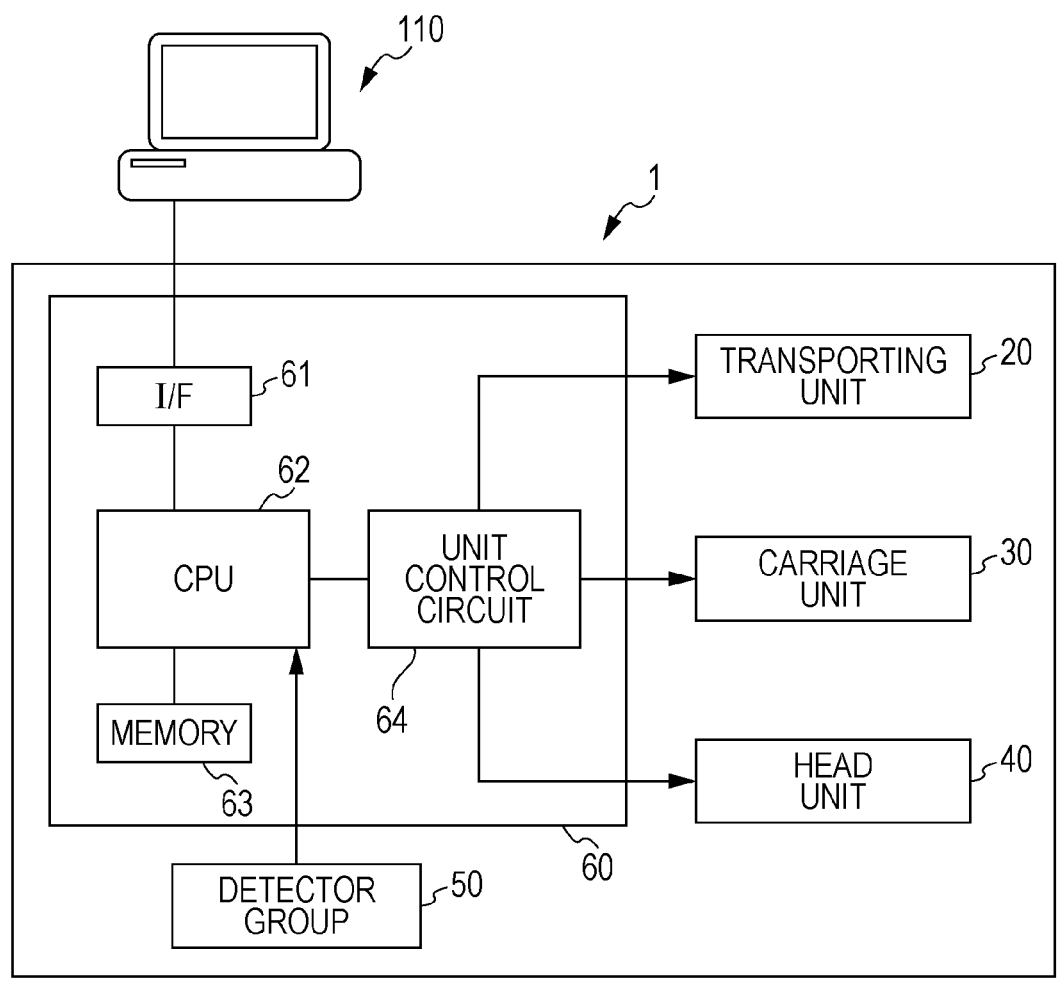
FIG. 9 is a block diagram of the entire configuration of a printer.

The following aspects are at least clarified by descriptions in the specification and the accompanying drawings.

An aspect of the invention is a recording apparatus that has a glitter ink nozzle capable of discharging a glitter ink to a medium, a first color ink nozzle capable of discharging a first color ink to the medium, and a second color ink nozzle capable of discharging a second color ink that is different from the first color ink to the medium and records a glitter color image on the medium through superimposing a glitter image formed by discharging the glitter ink and a color image formed by discharging at least one of the first color ink and the second color ink. The recording apparatus records a color sample table including a first pattern obtained by superimposing the glitter image and the color image and including a second pattern obtained by superimposing the glitter image and the color image having substantially the same color as that of the color image of the first pattern but different glossiness from that of the first pattern by using the first color ink or the second color ink at a different ink amount per unit area from that of the color image of the first pattern.

According to such a recording apparatus, glossiness can be adjusted using a color ink.

The color image of the first pattern and the color image of the second pattern preferably satisfy a relationship that the sum of the hue angle difference and the saturation difference is not higher than 10. In such a relationship, the first pattern and the second pattern are recognized to have substantially the same color.

The relationship between the first color ink and the second color ink is preferably that the hue angle difference is 35° or less. In such a relationship, patterns having substantially the same color can be formed.

The discharge amount per unit area of the glitter ink for forming the glitter image in the first pattern is preferably different from that of the glitter ink for forming the glitter image in the second pattern.

Alternatively, the difference in 60° glossiness in accordance with JIS Z 8741 (1997) between the first pattern and the second pattern is preferably 15 or more. By doing so, two patterns having different glossiness levels can be formed.

The recording apparatus preferably includes a first lookup table and a second lookup table that is different from the first lookup table for converting a color space and, based on common color information, determines the ink amounts per unit area of the first color ink and the second color ink for recording the first pattern using the first lookup table and determines the ink amounts per unit area of the first color ink and the second color ink for recording the second pattern using the second lookup table. By doing so, patterns having substantially the same color can be formed.

An image is preferably recorded on a medium by inputting a pattern selected by a user from the color sample table and processing image data for color conversion using a lookup table corresponding to the input pattern. By doing so, an image desired by the user is recorded on a medium.

Another aspect of the invention is a color sample table including a plurality of patterns each recorded by superimposing a glitter image formed by a glitter ink and a color image formed by at least one of a first color ink and a second color ink that is different from the first color ink. The color sample table includes a first pattern obtained by superimposing the glitter image formed with a predetermined ink amount per unit area and the color image and includes a second pattern obtained by superimposing the glitter image formed with the predetermined ink amount per unit area and the color image having substantially the same color as that of the color image of the first pattern by using the first color ink or the second color ink at a different ink amount per unit area from that of the color image of the first pattern.

According to such a color sample table, glossiness can be adjusted using a color ink.

Another aspect of the invention is a recording apparatus that has a glitter ink nozzle capable of discharging a glitter ink to a medium, a first color ink nozzle capable of discharging a first color ink to the medium, and a second color ink nozzle capable of discharging a second color ink that is different from the first color ink to the medium and records a glitter color image on the medium through superimposing a glitter image formed by discharging the glitter ink and a color image formed by discharging at least one of the first color ink and the second color ink. The recording apparatus, based on common color information of pixels, determines the ink amounts per unit area of the first color ink and the second color ink using a first lookup table for converting a color space and determines the ink amounts per unit area of the first color ink and the second color ink using a second lookup table that is different from the first lookup table; and, on a common medium, forms a first pattern by superimposing the glitter image formed with a predetermined ink amount per unit area and the color image formed with an ink amount determined based on the first lookup table and forms a second pattern by superimposing the glitter image formed with the predetermined ink amount per unit area and the color image formed with an ink amount determined based on the second lookup table.

According to such a recording apparatus, glossiness can be adjusted using a color ink.

FIG. 1 is a table showing measurement results of glitter patterns. Here, the glitter patterns are measured for coordinate value in an L*a*b* color space, hue angle (H[deg]), saturation (C*), and glossiness. Photographic paper, Gloss, (available from Seiko Epson Corporation) is used as a medium. Three glitter patterns of different ink amounts per unit area (glitter patterns to which a glitter ink is applied at duty 60%, duty 50%, or duty 40%, wherein the ink amount for forming large dots in all pixels is defined as duty 100%) are recorded on media, and each glitter pattern is subjected to the measurement. The coordinate values in an L*a*b* color space are the results of measurement with Spectrolino available from GretagMacbeth Ltd. (the same hereinafter). The hue angle (H[deg]) and the saturation (C*) in the table are calculated from the measurement results of L*a*b* (the same hereinafter). The glossiness is 60° glossiness measured in accordance with JIS Z 8741 (1997) using a gloss meter, MULTI GLOSS268, available from Konica Minolta, Inc. (the same hereinafter).

As understood from the measurement results of duty 60% and duty 50%, a variation in the amount of the glitter ink from duty 50% to duty 60% hardly changes the color tone, but changes only glossiness. On the other hand, as understood from the measurement results of duty 40%, in a low range of the ink amount per unit area of the glitter ink, a variation in the amount of the glitter ink changes not only the glossiness but also the hue angle and the saturation. This indicates that in recording of a glossy color image by superimposing a glitter image and a color image, a change in amount of the glitter ink in order to adjust the glossiness also causes changes in color tone and saturation, while the glossiness is drastically decreased when the color tone is adjusted by increasing the amount of the color ink in order to express glitter of a dark color.

The present inventors have found from the measurement results shown below that the glossiness can be adjusted by changing the amount of a color ink.

FIGS. 2 to 4 are tables showing measurement results of glitter color patterns each obtained by superimposing a glitter image and a color image of a cyan ink. FIG. 2 is a table of measurement results when a dark cyan ink was used. FIG. 3 is a table of measurement results when a light cyan ink containing the same coloring material as that of the dark cyan ink in FIG. 2 at a different concentration. FIG. 4 is a table of measurements results when a cyan ink containing a different coloring material from that of the cyan inks in FIGS. 2 and 3 was used. These tables also include measurement results of color difference (E*), as well as coordinate value in an L*a*b* color space, hue angle (H[deg]), saturation (C*), and glossiness.

The glitter image constituting the glitter color pattern is formed by applying the glitter ink at duty 60% in every pattern. The dark cyan ink in FIG. 2 is a cyan ink (Model Number: ICC37) of an ink set (Model Number: IC9CL3337) including nine ink cartridges manufactured by Seiko Epson Corporation. The light cyan ink in FIG. 3 is a light cyan ink (Model Number: ICLC37) of the same ink set. The cyan ink in FIG. 4 is a cyan ink (Model Number: ICC33) manufactured by Seiko Epson Corporation.

FIG. 5 shows five specific combinations (Specific Examples 1 to 5) extracted from the measurement results in FIGS. 2 and 3. FIG. 6 shows six specific combinations (Specific Examples 6 to 11) extracted from the measurement results in FIG. 2 or 3 and 4. FIG. 8 is a table showing judgment results of Specific Examples 1 to 11.

In FIG. 8, difference in color of two patterns is judged using the sum ($\Delta H+\Delta C$) of a hue angle difference ($\Delta H$) and a saturation difference ($\Delta C$) as an index. This index is an index that takes account of the characteristics of the human eye that barely distinguishes between two colors, when the hue angle difference is small, even if there is a certain saturation difference and also, when the saturation difference is small, even if there is a certain hue angle difference. Accordingly, when the $\Delta H+\Delta C$ value is 10 or less, preferably 8 or less, the two colors are barely distinguished by visual inspection and are therefore judged to have substantially the same hue angle and saturation. Furthermore, when the $\Delta H+\Delta C$ value is 6 or less, in particular, 4 or less, it is difficult to distinguish the two colors by visual inspection. When the $\Delta H+\Delta C$ value is 2 or less, it is significantly difficult to distinguish the two colors by visual inspection, and when the $\Delta H+\Delta C$ value is 1 or less, it is difficult even for an expert to distinguish the two colors by visual inspection. The specific combinations shown in FIG. 8 each have substantially the same hue angle and saturation, and a combination where the $\Delta H+\Delta C$ value is less than 1 is shown as "S", a combination where the $\Delta H+\Delta C$ value is 1 or more and less than 2 is shown as "A", a combination where the $\Delta H+\Delta C$ value is 2 or more and less than 4 is shown as "B", and a combination where the $\Delta H+\Delta C$ value is 4 or more and less than 6 is shown as "C". Here, the hue angle difference $\Delta H$ is expressed as a value ranging from 0° to 360° from the coordinate a* defined as 0° toward the positive direction of the coordinate b* in an L*a*b* color space.

The index for difference in color between two patterns may be a color difference: $\Delta E^*ab$ ($=\{\Delta L^2+\Delta a^2+\Delta b^2\}^{(1/2)}$), which is generally used as an index, instead of the $\Delta H+\Delta C$ value shown in FIG. 8. A $\Delta E^*ab$ value of 6.5 or less is a generally acceptable range as substantially the same color. A $\Delta E^*ab$ value of 3.15 or less is a range in which two patterns not arranged side by side are recognized to have substantially the same color. A $\Delta E^*ab$ value of 1.6 or less is a range in which two patterns arranged side by side are recognized to have the same color. A $\Delta E^*ab$ value of 0.8 or less is a critical range for repeatable visual judgment.

In addition, the difference in 60° glossiness of two patterns is preferably 15 or more. The difference in glossiness that is desired by users may not be uniformly determined, but is more preferably 20 or more when the patterns each have a 60° glossiness of less than 200, and 40 or more when the patterns each have a 60° glossiness of 200 or more. In a range of low glossiness, the human eye recognizes even a small difference in glossiness as a large difference. JIS Z 8741 (1997) is an example of the standard regarding glossiness.

Furthermore, the discharge amounts per unit area of the glitter images as the bases of two patterns may be different from each other. As shown in FIG. 1, glossiness changes by varying the discharge amount per unit area of the glitter ink. Accordingly, the glossiness can be adjusted by means of the discharge amount per unit area of the glitter ink. Thus, a pattern desired by a user can be readily formed.

As obvious from the comparison of measurement results of two patterns of each of Specific Examples 1 to 11, patterns having substantially the same color (patterns having substantially the same hue angle and saturation when using $\Delta H+\Delta C$ as the index) can be formed. For example, in the two patterns of Specific Example 2, the $\Delta H+\Delta C$ value is less than 1. Consequently, the patterns have substantially the same color such that even an expert barely distinguishes the two patterns by visual inspection.

The measurement results of two patterns of each of Specific Examples 1 to 11 show a large different in glossiness in spite of substantially the same color. For example, in Specific Example 1, the glossiness when a color image of a light cyan ink is superimposed on a glitter image is "347", and the glossiness when a color image of a dark cyan ink is superimposed on a glitter image is "267". Thus, though the colors are substantially the same, the glossiness differs by "80".

Alternatively, glossiness can be adjusted by varying the ink amounts per unit area of two inks while maintaining substantially the same color. For example, though the color images are formed by only a light cyan ink or a dark cyan ink in Specific Example 1, the glossiness can be arbitrarily adjusted within a range of 267 to 347 by forming the color image so as to include both dots of the light cyan ink (light dots) and the dark cyan ink (dark dots). Specifically, the glossiness can be adjusted to 307 (the median value between 347 and 267) by forming the color image using the light cyan ink at duty 14% and the dark cyan ink at duty 9.5% while maintaining substantially the same color as those of the two patterns of Specific Example 1.

It can be understood from these measurement results that glossiness can be adjusted by varying the amount of color inks. Accordingly, in this embodiment, color samples including a plurality patterns having substantially the same color but having different glossiness are recorded.

The substantially the same colors may be formed by using a dark ink and a light ink containing the same coloring material as shown in Specific Examples 1 to 5 or may be formed by using two inks of which coloring materials are different as shown in Specific Examples 6 to 11. That is, a plurality of patterns having substantially the same color but having different glossiness can be formed as long as patterns having substantially the same color can be formed using at least two inks at different ink amounts per unit area.

Configuration of Recording Apparatus

Figure 10A:
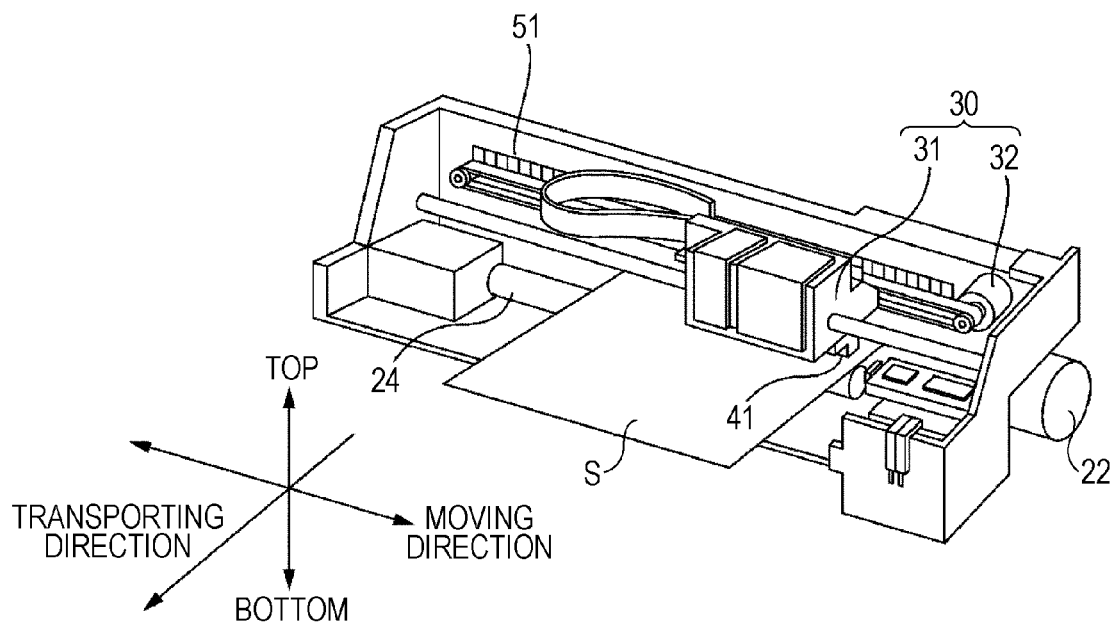
FIG. 10A is a schematic cross-sectional view of the printer.
Figure 10B:
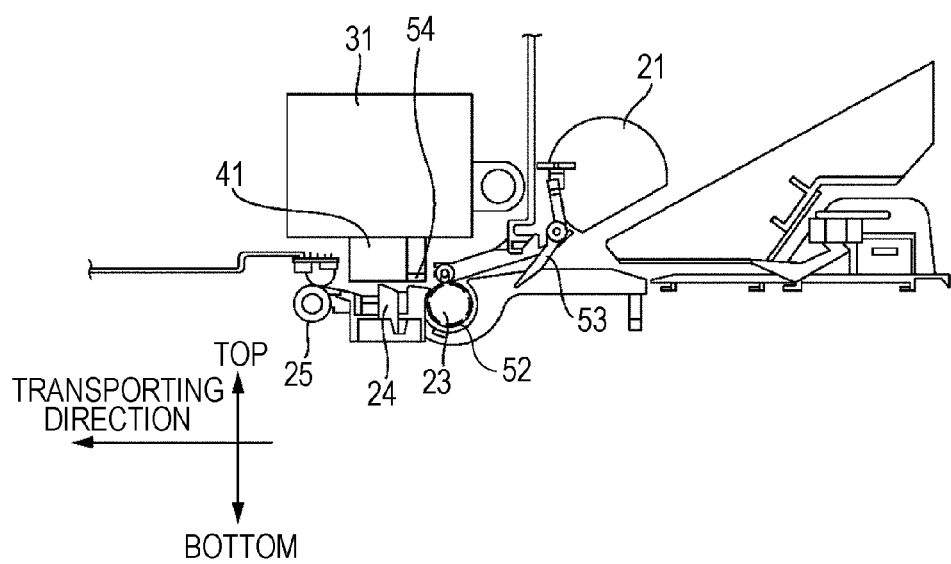
FIG. 10B is a schematic top view of the printer.

FIG. 9 is a block diagram of the entire configuration of a printer 1. FIG. 10A is a schematic cross-sectional view of the printer 1, and FIG. 10B is a schematic top view of the printer 1. An embodiment of the recording apparatus will now be described with reference to the case of the printer 1 connected to a computer 110.

The printer 1 of this embodiment includes a transporting unit 20, a carriage unit 30, a head unit 40, a detector group 50, and a controller 60. The printer 1 received printing data from the computer 110, which is an external device, controls each unit (the transporting unit 20, the carriage unit 30, and the head unit 40) by the controller 60. The controller 60 controls each unit based on the printing data received from the computer 110 and prints an image on paper. The conditions inside the printer 1 are monitored by the detector group 50, and the detector group 50 outputs the detection results to the controller 60. The controller 60 controls each unit based on the detection results output from the detector group 50.

The transporting unit 20 transports a medium (e.g., paper S) in a predetermined direction (hereinafter referred to as transporting direction). This transporting unit 20 includes a paper feeding roller 21, a paper feeding motor 22 (also referred to as PF motor), a transporting roller 23, a platen 24, and a paper discharging roller 25. The paper feeding roller 21 is a roller for feeding the paper in a paper insertion slot into the inside of the printer. The transporting roller 23 is a roller for transporting the paper S fed by the paper feeding roller 21 to the area where printing can be performed and is driven by the paper feeding motor 22. The platen 24 supports the paper S during the printing process. The paper discharging roller 25 is a roller for discharging the paper S to the outside of the printer and is arranged downstream in the transporting direction with respect to the area where printing can be performed.

The carriage unit 30 is used for moving (also expressed as scanning) the head in a predetermined direction (hereinafter referred to as moving direction). The carriage unit 30 includes a carriage 31 and a carriage motor 32 (also referred to as CR motor). The carriage 31 can reciprocate in the moving direction and is driven by the carriage motor 32. The carriage 31 detachably holds ink cartridges containing inks.

The head unit 40 discharges an ink to paper. The head unit 40 includes a head 41 having a plurality of nozzles. This head 41 is provided to the carriage 31 and therefore moves in the moving direction together with the carriage 31. The head 41 intermittently discharges an ink while moving in the moving direction to form a dot line (raster line) along the moving direction on paper.

The detector group 50 includes a linear encoder 51, a rotary encoder 52, a paper detection sensor 53, an optical sensor 54, and other components. The linear encoder 51 detects the position of the carriage 31 in the moving direction. The rotary encoder 52 detects the rotation amount of the transporting roller 23. The paper detection sensor 53 detects the position of the leading end of the paper being fed. The optical sensor 54 detects the presence or absence of paper by a light emitter and a light receiver provided to the carriage 31. The optical sensor 54 detects the positions of the side ends of paper while moving with the carriage 31 to detect the width of paper. The optical sensor 54 can detect the leading end of the paper (the end on the downstream side in the transporting direction, and also referred to as top end) and the tail end (the end on the upstream side in the in the transporting direction, and also referred to as bottom end), according to conditions.

The controller 60 is a control unit (controlling portion) for controlling the printer. The controller 60 includes an interface 61, a CPU 62, a memory 63, and a unit control circuit 64. The interface 61 transmits and receives data between the computer 110 as an external device and the printer 1. The CPU 62 is an arithmetic processing unit for controlling the whole printer. The memory 63 reserves, for example, storing space and working space of the program of the CPU 62, and includes storage elements such as a RAM and an EEPROM. The CPU 62 controls each unit through the unit control circuit 64 according to the program stored in the memory 63.

Configuration of the Underside of Carriage

FIG. 11 is an explanatory drawing of the underside of the carriage.

The head 41 is provided on the underside of the carriage 31. The head 41 has seven nozzle lines. The seven nozzle lines are a black nozzle line (K) for discharging a black ink, a dark cyan nozzle line (DC) for discharging a dark cyan ink, a light cyan nozzle line (LC) for discharging a light cyan ink, a dark magenta nozzle line (DM) for discharging a dark magenta ink, a light magenta nozzle line (LM) for discharging a light magenta ink, a yellow nozzle line (Y) for discharging a yellow ink, and a glitter nozzle line (Me) for discharging a glitter ink. The black nozzle line, the dark cyan nozzle line, the light cyan nozzle line, the dark magenta nozzle line, the light magenta nozzle line, and the yellow nozzle line (color nozzle lines) discharge color inks for forming a color image. The glitter nozzle line discharges a glitter ink for forming a glitter image.

Each nozzle line includes 180 nozzles. The 180 nozzles of each nozzle line are arranged along the transporting direction with a predetermined nozzle pitch. In this embodiment, the nozzles are arranged with intervals of $1/180$ inch (i.e., the length of each nozzle line is 1 inch). Accordingly, a line of dots arranged with intervals of $1/180$ inch is formed along the transporting direction by intermittently discharging the ink from each nozzle line for each moving (for each pulse) of the carriage 31 in the moving direction.

Though the dark cyan nozzle line (DC) and the light cyan nozzle line (LC) each discharge a cyan ink, the cyan concentrations of the inks are different. In this embodiment, as the dark cyan ink, cyan inks, Model Numbers ICC37 and ICC33 manufactured by Seiko Epson Corporation, are used, and as the light cyan ink, a light cyan ink, Model Number ICLC37 manufactured by Seiko Epson Corporation, is used. As described above, these inks are not limited to combinations of a dark ink and a light ink. For example, a combination of an ink, Model Numbers ICC37 manufactured by Seiko Epson Corporation, and an ink, Model Numbers ICLC33 manufactured by Seiko Epson Corporation, may be employed. As described below, any combination of two cyan inks can be employed as long as patterns having substantially the same color can be formed by varying the ink amounts per area unit of the two cyan inks. In order to that the two cyan inks can form patterns having substantially the same color, the hue angle difference between the two cyan inks is preferably 35° or less, preferably 30° or less, more preferably 25° or less, more preferably 20° or less, and most preferably 15° or less. Alternatively, the two cyan inks may contain the same coloring material at different concentrations. It is more preferable that the hue angle difference between the two cyan inks be 35° or less and that the two cyan inks contain the same coloring material at different concentrations. The term "the same coloring material" refers to, for example, that the C. I. numbers are the same. The coloring material may be either a dye or a pigment. As shown in FIG. 7, the hue angle differences between ICC37 and ICC33 and between ICC37 and ICLC37 are each 35° or less at the same recording density (substantially the same discharging amount). FIG. 7 shows the measurement results when each ink was discharged to photographic paper, Gloss, (available from Seiko Epson Corporation) with a printer PX-G930 (available from Seiko Epson Corporation).

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264; and C.I. Pigment Violet 19, 23, 32, 33, 36, 38, 43, and 50.

Examples of cyan pigments include C.I. Pigment Blue 1, 2, 3, 15, 15:1, 15:2, 15:3, 15:4, 15:6, 15:34, 16, 18, 22, 25, 60, 65, and 66; and C.I. Vat Blue 4 and 60.

Examples of yellow dyes include C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 58, 85, 86, 87, 88, 89, 98, 110, 132, 142, and 144; C.I. Reactive Yellow 1, 2, 3, 4, 6, 7, 11, 12, 13, 14, 15, 16, 17, 18, 22, 23, 24, 25, 26, 27, 37, and 42; C.I. Food Yellow 3 and 4; and C.I. Solvent Yellow 15, 19, 21, 30, and 109.

Specific examples of magenta dyes include C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; C.I. Solubilized Red 1; and C.I. Food Red 7, 9, and 14.

Specific examples of cyan dyes include C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46; C.I. Solubilized Vat Blue 1, 5, and 41; C.I. Vat Blue 4, 29, and 60; C.I. Food Blue 1 and 2; and C.I. Basic Blue 9, 25, 28, 29, and 44.

The magenta inks discharged by the dark magenta nozzle line (DM) and the light magenta nozzle line (LC) satisfy a relationship similar to that in the above-described two cyan inks. Accordingly, the descriptions of the magenta inks are omitted.

The glitter ink contains metal particles such as silver particles or aluminum (aluminum laminae or aluminum flakes). In the case using aluminum as the coloring material, aluminum flakes are arranged approximately parallel to the printing medium, but are not actually parallel due to overlapping thereof. Consequently, the glossiness in the case using aluminum as a coloring material is not specular gloss, which has high glossiness, but is matte glossiness in many cases. On the other hand, a glitter ink containing silver particles can form a glitter image with high glossiness compared to that formed with the glitter ink containing aluminum. In this embodiment, since glossiness is decreased when the glossiness is adjusted with a color image, it is advantageous that the glossiness of an original glitter image be high. Accordingly, a glitter ink containing silver particles is used. However, the effects of the invention are not limited to the cases using silver as a coloring material of the glitter ink and can be applied to the cases using aluminum or other metals as coloring materials.

The solvent for the glitter ink is pure water such as deionized water, ultrafiltration water, reverse osmosis water, or distilled water, or ultrapure water. Such water may contain, for example, ions in a degree that does not inhibit dispersion of metal particles. The glitter ink may optionally contain, for example, a surfactant, a moisturizing agent, a thickener, a pH adjuster, an antiseptic, or a resin.

The silver particles are particles of which main component is silver. The silver particles may contain an accessory component such as another metal, oxygen, or carbon or may be made of an alloy of silver and another metal. The silver particles in an ink composition may be present in a colloidal state (colloidal particles). In the case where the silver particles are dispersed in a colloidal state, the dispersibility is good, resulting in, for example, an improvement in storage stability of the ink composition.

The glitter ink is produced by the following method: Polyvinylpyrrolidone (PVP, weight-average molecular weight: 10000) is heated at 70° C. for 15 hours and is subsequently cooled to room temperature. A PVP solution is prepared by adding 1000 g of the PVP to 500 mL of an ethylene glycol solution. Separately, a silver nitrate solution is prepared by adding 128 g of silver nitrate to 500 mL of ethylene glycol and sufficiently stirring the resulting mixture with an electromagnetic stirrer. The silver nitrate solution is added to the PVP solution with stirring using an overhead mixer at 120° C., and the resulting mixture is heated for about 80 min to accelerate the reaction, followed by cooling to room temperature. The resulting solution is centrifugated at 2200 rpm for 10 min with a centrifuge. The separated silver particles are added to 500 mL of an ethanol solution for removing excess PVP. The silver particles are separated by further centrifugation and are dried with a vacuum drier at 35° C. under a pressure of 1.3 Pa.

A glitter ink is prepared by mixing 10% by mass of the thus-prepared silver particles, 3% by mass of 1,2-hexanediol, 10% by mass of trimethylolpropane, 1% by mass of Olfine E1010 (Nissin Chemical Industry Co., Ltd.) as a surfactant, 1% by mass of triethanolamine, and deionized water as the residue. Printing is performed on photographic paper, Gloss, (available from Seiko Epson Corporation) as a medium using a printer PX-G930 (available from Seiko Epson Corporation).

First Embodiment

A user creates an image by a drawing program of a computer 110. In such a case, the image actually recorded by a printer 1 tends to differ from the image on the display of the computer 110 in, for example, color or gloss. The differences between the two images are particularly significant in glossy images.

Accordingly, it is thought to allow the printer 1 to output an image having color and glossiness desired by a user by recording a color sample table in the printer 1 so that the user can select a patch pattern having the desired color and glossiness from the color sample table.

FIG. 12 is an explanatory drawing of a color sample table in the First Embodiment. The color sample table is a color chart including a large number of patch patterns. The patch patterns are recorded in the printer 1 and are different from one another in combination of ink amounts per unit area of the inks.

Each patch pattern of this embodiment is formed by superimposing a color image onto a glitter image and has glossiness. Here, the glitter image is formed by applying the glitter ink at duty 60% for every patch pattern.

In a usual color sample table, patch patterns having substantially the same color are not recorded, because it is meaningless to record a plurality of patch patterns having substantially the same color.

On the other hand, the color sample table of this embodiment includes a plurality of patch patterns having substantially the same color. For example, in the three patch patterns shown in the drawing, the color images each formed on the glitter image have substantially the same color. As obvious from the above-mentioned Specific Example 1 of FIG. 5, the glossiness of the patch pattern formed by applying a dark cyan ink to a glitter image at duty 19% is smaller than that of the patch pattern formed by applying a light cyan ink to a glitter image at duty 28%. A patch pattern formed of dots of the dark cyan ink and the light cyan ink has intermediate glossiness. Thus, three patch patterns have substantially the same color, but are recognized to be different from one another in glossiness.

Consequently, a user can select a patch pattern having not only a desired color but also desired glossiness from the color sample table.

Second Embodiment

Original Image

Figure 13:
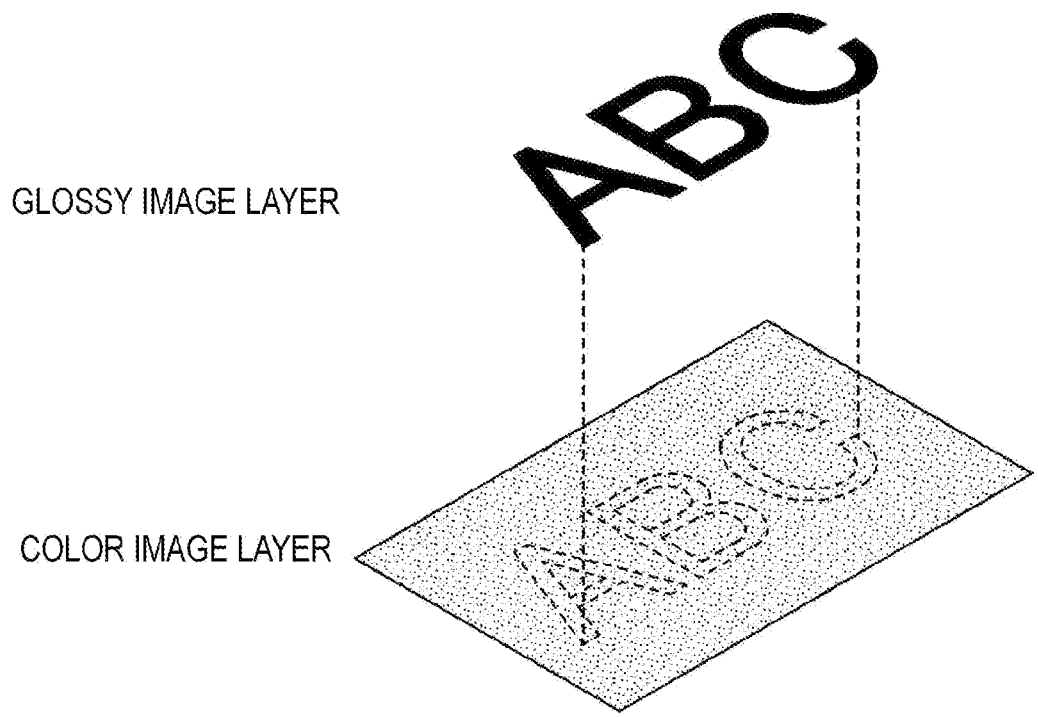
FIG. 13 is an explanatory drawing of an original image created by a drawing program of a computer by a user.

FIG. 13 is an explanatory drawing of an original image created by a drawing program of a computer 110 by a user.

The original image has a glossy image layer and a color image layer. A glossy image having glossiness determined by the user is drawn in this glossy image layer. This glossy image is composed of pixels showing glossiness with multi-gradation. In the following descriptions, the glossiness of the glossy image should be only high or low for simplifying the descriptions. In the glossy image in the drawing, an area of high glossiness is shown in black. That is, in this glossy image, the pixels constituting the image "ABC" are high glossiness pixels.

In the color image layer, a color image is drawn with 256 gradations of an RGB color space. Here, in order to simplify the descriptions, the color image should be drawn with only cyan having the same gradation.

Figure 14A:
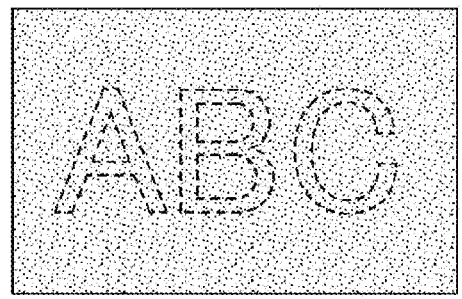
FIG. 14A is an explanatory drawing of printed matter of an original image intended by a user, when viewed from above.
Figure 14B:
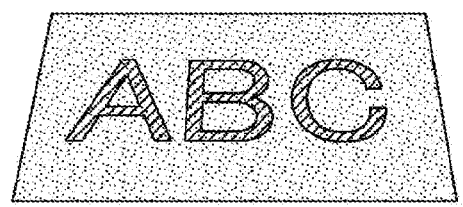
FIG. 14B is an explanatory drawing of the printed matter, when viewed from an angle at which light from a light source is reflected.

FIGS. 14A and 14B are explanatory drawings of printed matter of an original image desired by a user. FIG. 14A is an explanatory drawing of printed matter, when viewed from above, and FIG. 14B is an explanatory drawing, when viewed from an angle at which light from a light source is reflected. Thus, in this embodiment, the printed matter desired by a user is merely a solid cyan image when viewed from above, but an image of ABC comes up when viewed from an angle reflecting light.

Conditioning

FIG. 15 is a flow chart of conditioning.

A user designates arbitrary pixels for an original image (S101). The computer 110 acquires the gradation values (RGB values) set in the color image layer as color information of the pixels designated by the user.

Then, a color conversion process (S102) where the computer 110 converts the acquired RGB values (256 gradations) to CMYK values (256 gradations) of a CMYK color space is performed. Here, the color image of the initial image is drawn with only a cyan color, and therefore only the gradation value (C value) of cyan is a predetermined value. Other values (M value, Y value, and K value) than the C value are all zero. Accordingly, their descriptions are omitted here. This color conversion process uses a well known lookup table (LUT) for converting coordinate values of an RGB color space to coordinate values of a CMYK color space.

Then, a tone conversion process (S103) where the computer 110 converts the gradation value (C value) of 256 gradations for cyan to gradation values (DC value and LC value) of 256 gradations of dark cyan and light cyan. Such a conversion process is necessary in gradation values for cyan and magenta when a printer 1 uses dark inks and light inks of cyan and magenta. The computer 110 is provided with a cyan lookup table (CLUT) in advance for converting a C value to a DC value and an LC value. In other words, the cyan lookup table (CLUT) is a table for converting a coordinate value of a C color space to coordinate values of a DC-LC color space. Here, the computer 110 has three CLUTs (CLUTs 1 to 3), and a coordinate value (C value) of cyan is converted to (DC1, LC1) by CLUT 1, to (DC2, LC2) by CLUT 2, and to (DC3, LC3) by CLUT 3. That is, in this embodiment, three combinations of gradation values of dark cyan and light cyan are created from one C value. In other words, in this embodiment, three combinations of gradation values of dark cyan and light cyan are created from common color information (RGB value) of a pixel designated by a user.

CLUT 1 is a lookup table for setting gradation values of dark cyan and light cyan by giving priority to increasing the density (gradation value) of dark cyan (in other words, CLUT 1 is a lookup table for setting gradation values of dark cyan and light cyan by giving priority to decreasing the density of light cyan). CLUT 3 is a lookup table for setting gradation values of dark cyan and light cyan by giving priority to increasing the density of light cyan. CLUT 2 is a lookup table having intermediate properties between CLUT 1 and CLUT 3.

The gradation value of dark cyan is information indicating the ink amount per unit area of the dark cyan ink for forming a patch pattern. The gradation value of light cyan is information indicating the ink amount per unit area of the light cyan ink for forming the patch pattern.

Then, the computer 110 records a color sample table composed of three patch patterns in the printer 1 (S104) based on three combination of gradation values of dark cyan and light cyan. The printer 1 forms a glitter image on a medium and also forms a color image on the glitter image according to the printing data received from the computer 110. Here, the glitter image is formed by applying a glitter ink to the medium at duty 60%. The color image is formed by applying a dark cyan ink to the medium at duty corresponding to the gradation value (DC value) of dark cyan and also applying a light cyan ink to the medium at duty corresponding to the gradation value (LC value) of light cyan. In the patch pattern corresponding to CLUT 1, the duty of the dark cyan ink is relatively high, and the duty of the light cyan ink is relatively high in the patch pattern corresponding to CLUT 3.

The three patch patterns are images corresponding to a common RBG value and therefore have substantially the same color, but, as described above, have different glossiness levels.

Then, the user selects a desired patch pattern from the three patch patterns and inputs the selected pattern number into the computer 110 (S105).

In this embodiment, the above-described conditioning is performed for two cyan areas of low glossiness (area other than the image ABC) and high glossiness (area of the image ABC). Here, a patch pattern corresponding to CLUT 1 is selected for the former, and a patch pattern corresponding to CLUT 3 is selected for the latter.

Printing

FIG. 16 is a flow chart of printing. After the conditioning, an initial image is printed.

First, the computer 110 performs a resolution conversion process (S201) for converting an initial image into a resolution (printing resolution) for recording on a medium. For example, in the case of a printing resolution of 720×720 dpi, the computer 110 converts the initial image to bitmap image data with a resolution of 720×720 dpi. The pixel data after the resolution conversion processing of the image data is of 256 gradations of an RGB color space.

Then, the computer 110 performs a color conversion process (S202) for converting the image data of an RGB color space to image data of a CMYK color space. This color conversion process is performed based on a well known lookup table (LUT).

Figure 17:
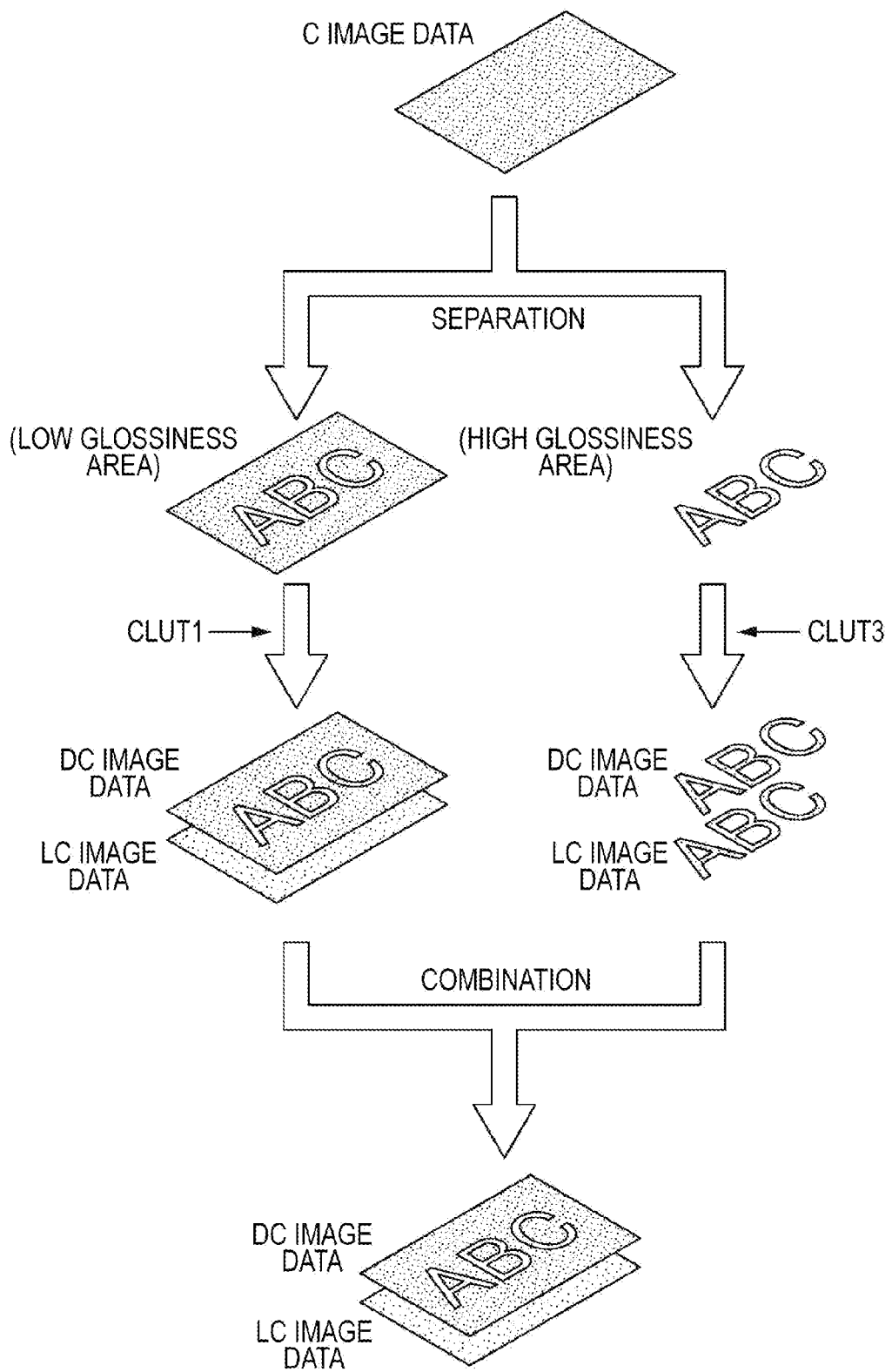
FIG. 17 is an explanatory drawing of a tone conversion process.

Then, the computer 110 performs a tone conversion process (S203) for cyan and magenta. FIG. 17 is an explanatory drawing of the tone conversion process. Here, the color image of the initial image is drawn with only a cyan color, and therefore only the image data of cyan (C image data) will be described.

The computer 110 separates the C image data depending on the set glossiness of the glitter image layer (see FIG. 13). Here, the C image data is separated into two areas of low glossiness (area other than the image ABC) and high glossiness (area of the image ABC).

Then, the computer 110 creates dark cyan image data and light cyan image data from each separated C image data using the cyan lookup table. In other words, the computer 110 converts the gradation value (C value) of each pixel constituting the C image data to a dark cyan gradation value and a light cyan gradation value (DC value and LC value) using the cyan lookup table.

On this occasion, dark cyan image data and light cyan image data are created by using CLUT 1 for the C image data of the low glossiness area and CLUT 3 for the C image data of the high glossiness area, respectively. CLUT 1 and CLUT 3 are cyan lookup tables determined by selecting patch patterns by the above-described conditioning.

The computer 110 combines the dark cyan image data for the low glossiness area and the dark cyan image data for the high glossiness area to create total dark cyan image data. The computer 110 further combines the light cyan image data for the low glossiness area and the light cyan image data for the high glossiness area to create total light cyan image data.

By performing the tone conversion process shown in FIG. 17, dark cyan image data and light cyan image data are created from the cyan image data.

After the tone conversion processing (S203), the computer 110 performs a half-tone process (S204). In the half-tone process, the image data of 256 gradations is converted to image data having the number of gradations (two gradations or four gradations) that can be formed by the printer 1. In the half-tone process, for example, dithering, γ correction, or random dither is employed. In the image data after the half-tone processing, one-bit or two-bit pixel data correspond to each pixel, and the pixel data show the formation conditions of dots at each pixel (the presence or absence of dot and dot size).

Then, the computer 110 performs a rasterization process (S205) where the pixel data arranged in a matrix form are rearranged according to the dot forming order for printing. For example, when dot formation is performed in several times during the printing, pixel data corresponding to each dot formation are extracted for each formation step and are rearranged according to the dot forming order. Since the dot forming order during printing varies depending on the printing system, the rasterization corresponding to the printing system is performed.

Finally, the computer 110 creates printing data by adding command data (e.g., transportation data indicating transportation amount) corresponding to a printing system to rasterized data and transmits the printing data to the printer 1. The printer 1 prints an image on a medium according to the printing data received from the computer 110.

Figure 18:
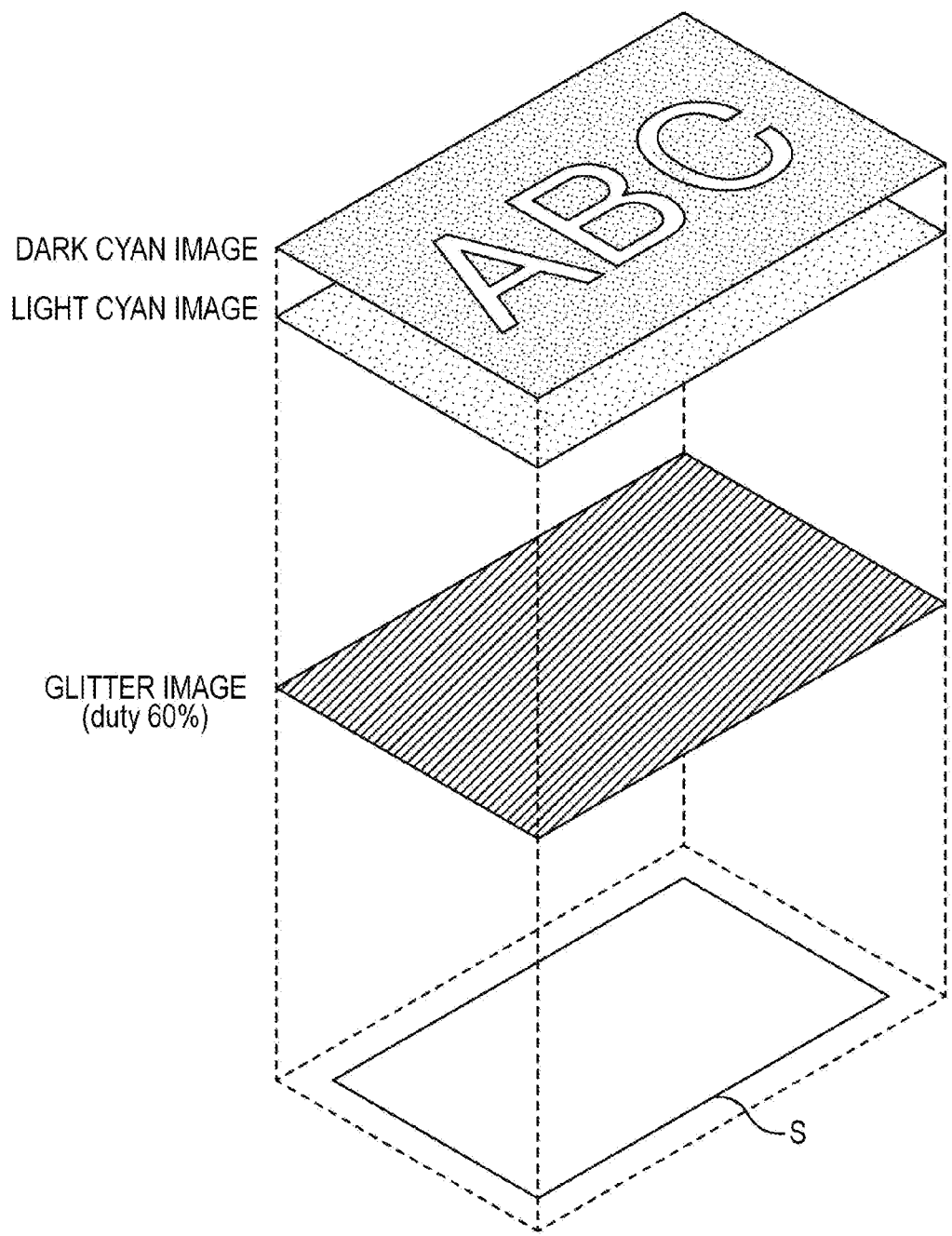
FIG. 18 is an explanatory drawing of an image printed on a medium.

FIG. 18 is an explanatory drawing of an image printed on a medium.

In this embodiment, the printer 1 records a glitter image on a medium by applying a glitter ink to the medium at duty 60%. The glossiness of the glitter image recorded on the medium is duty 60% at every area, while the glossiness in the initial image changes corresponding to the area. Subsequently, the printer 1 records a color image on the glitter image. Here, a dark cyan image of a dark cyan ink and a light cyan image of a light cyan ink are superimposed on the glitter image at approximately the same time to record a color image in such a manner that the duty of the dark cyan ink is relatively high in the low glossiness area (area other than the image ABC) and that the duty of the light cyan ink is relatively high in the high glossiness area (area of the image ABC). The colors of both areas are substantially the same.

By the above-described conditioning and printing processing, a printed matter shown in FIGS. 14A and 14B are obtained as desired by a user. That is, obtained is a printed matter that is merely a solid cyan image (image of substantially the same color) when viewed from above, but an image of ABC comes up when viewed from an angle reflecting light.

According to this embodiment, a printed matter of which glossiness is adjusted can be obtained by adjusting the application of a color ink while maintaining the duty of a glitter image constant. That is, a printed matter having the same color but having different glossiness can be obtained.

In the embodiment, for simplifying the descriptions, the glossiness of the glossy image in the initial image is two levels, and the color image of the initial image is drawn with only a cyan color with the same gradation, but the initial image is not limited thereto.

Others

In the above-described embodiments, the printer is mainly described, but the descriptions also include disclosure of, for example, a printing apparatus, a printing method, a program, and a memory medium for storing the program.

The above-described embodiments are merely for easily illustrating the invention and are not intended to limit the invention. The invention can be modified or improved without departing from the gist of the invention, and the invention also includes equivalents of the invention. In particular, the following embodiments are also included in the invention.

Patch Pattern

In the above-described embodiments, though three patch patterns having substantially the same color are formed, the patch patterns are not limited thereto as long as at least two patch patterns having substantially the same color are formed. However, a larger number of the patch patterns increases the range from which a user selects and enables to finely adjust glossiness.

The number of the patch patterns may be varied according to the color. For example, the color corresponding to Specific Example 1 in FIG. 5 has a broad adjustable range of glossiness of 267 to 347, whereas the color corresponding to Specific Example 2 has a narrow adjustable range of glossiness of 335 to 364. Accordingly, a large number of patch patterns may be formed for the color of a broad adjustable range (see FIG. 8), while a small number of patch patterns may be formed for the color of a narrow adjustable range.

Glitter Image

In the above-described embodiments, though the glitter image is formed with a uniform ink amount per unit area at duty 60%, the ink amount is not limited thereto. The ink amount of the glitter image may be varied.

In particular, the color hardly changes even if the ink amount per unit area of the glitter ink is varied in the range of duty 50% to 60% (see FIG. 1), and therefore the ink amount per unit area of the glitter ink may be varied in this range. If there is a need to adjust glossiness under conditions that a variation of the ink amount per unit area of a glitter ink changes the color, the glossiness may be adjusted by adjusting the color image as in the above-described embodiments.

Processing by Computer 110

In the above-described embodiments, though each image processing such as the color conversion process is performed by the computer 110, the processing is not limited thereto. The processing performed by the computer 110 may be partially or completely performed by the printer 1.

Nozzle

In the above-described embodiments, though inks are discharged by means of piezoelectric devices, the system for discharging a liquid is not limited thereto. For example, other systems such as a system generating bubbles by heat in a nozzle may be employed.

What is claimed is:

1. A recording apparatus comprising:
   a glitter ink nozzle capable of discharging a glitter ink to a medium;
   a first color ink nozzle capable of discharging a first color ink to the medium; and
   a second color ink nozzle capable of discharging a second color ink that is different from the first color ink to the medium, and
   the recording apparatus recording:
   a glitter color image on the medium through superimposing a glitter image formed by discharging the glitter ink and a color image formed by discharging at least one of the first color ink and the second color ink,
   wherein the recording apparatus records a color sample table including:
   a first pattern obtained by superimposing the glitter image and the color image; and
   a second pattern obtained by superimposing the glitter image and the color image having substantially the same color as that of the color image of the first pattern but different glossiness from that of the first pattern by using the first color ink or the second color ink at a different ink amount per unit area from that of the color image of the first pattern.

2. The recording apparatus according to claim 1, wherein the color image of the first pattern and the color image of the second pattern satisfy a relationship that the sum of the hue angle difference and the saturation difference is not higher than 10.

3. The recording apparatus according to claim 1, wherein the first color ink and the second color ink satisfy a relationship that the hue angle difference is not higher than 35° C.

4. The recording apparatus according to claim 1, wherein the difference in 60° glossiness in accordance with JIS Z 8741 (1997) between the first pattern and the second pattern is 15 or more.

5. The recording apparatus according to claim 1, wherein
   a discharge amount per unit area of the glitter ink for forming the glitter image in the first pattern is different from a discharge amount per unit area of the glitter ink for forming the glitter image in the second pattern.

6. The recording apparatus according to claim 1, further comprising:
   a first lookup table and a second lookup table that is different from the first lookup table for converting a color space, wherein
   ink amounts per unit area of the first color ink and the second color ink for recording the first pattern are determined using the first lookup table, and ink amounts per unit area of the first color ink and the second color ink for recording the second pattern are determined using the second lookup table, based on common color information.

7. The recording apparatus according to claim 1, further comprising:
   a first lookup table and a second lookup table that is different from the first lookup table for converting a color space, wherein
   ink amounts per unit area of the first color ink and the second color ink for recording the first pattern are determined using the first lookup table, and ink amounts per unit area of the first color ink and the second color ink for recording the second pattern are determined using the second lookup table, based on common color information; and
   an image is recorded on a medium by inputting a pattern selected by a user from the color sample table and processing image data for color conversion using a lookup table corresponding to the input pattern.

8. A color sample table comprising:
   a plurality of patterns each recorded by superimposing a glitter image formed by a glitter ink and a color image formed by at least one of a first color ink and a second color ink that is different from the first color ink,
   wherein the color sample table includes
   a first pattern obtained by superimposing the glitter image formed with a predetermined ink amount per unit area and the color image; and
   a second pattern obtained by superimposing the glitter image formed with the predetermined ink amount per unit area and the color image having substantially the same color as that of the color image of the first pattern by using the first color ink or the second color ink at a different ink amount per unit area from that of the color image of the first pattern.

9. A recording apparatus comprising:
   a glitter ink nozzle line capable of discharging a glitter ink to a medium;
   a first color ink nozzle line capable of discharging a first color ink to the medium; and
   a second color ink nozzle line capable of discharging a second color ink that is different from the first color ink to the medium, and
   the recording apparatus recording:
   a glitter color image on the medium through superimposing a glitter image formed by discharging the glitter ink and a color image formed by discharging at least one of the first color ink and the second color ink,
   wherein the recording apparatus determines based on common color information:
   ink amounts per unit area of the first color ink and the second color ink using a first lookup table for converting a color space; and
   ink amounts per unit area of the first color ink and the second color ink using a second lookup table that is different from the first lookup table, and
   the recording apparatus forms on a common medium:
   a first pattern by superimposing the glitter image formed with a predetermined ink amount per unit area and the color image formed with an ink amount determined based on the first lookup table; and
   a second pattern by superimposing the glitter image formed with the predetermined ink amount per unit area and the color image formed with an ink amount determined based on the second lookup table.

* * * * *